United States Patent [19]

Adahan

[11] 3,847,449
[45] Nov. 12, 1974

[54] SOLENOID POWERED BRAKE PRESSURE MODULATOR

[76] Inventor: Carmeli Adahan, 1930 Vine St., No. 303, Berkely, Calif. 97709

[22] Filed: June 8, 1973

[21] Appl. No.: 368,297

[52] U.S. Cl. ............. 303/21 F, 188/181 A, 303/61
[51] Int. Cl. .............................................. B60t 8/06
[58] Field of Search ...... 303/10, 21 R, 21 F, 61–63, 303/68–69; 188/181 R, 181 A

[56] References Cited
UNITED STATES PATENTS

| | | | |
|---|---|---|---|
| 3,066,988 | 12/1962 | McRae | 303/21 F |
| 3,740,105 | 6/1973 | Holmes | 303/21 F |
| 3,749,125 | 7/1973 | Peruglia et al. | 303/21 F |
| 3,753,598 | 8/1973 | Michellone et al. | 303/21 F |

*Primary Examiner*—Trygve M. Blix
*Assistant Examiner*—Jesus D. Sotelo
*Attorney, Agent, or Firm*—Irvin L. Groh

[57] ABSTRACT

A brake pressure modulator for a hydraulic brake system in which the modulator is powered by a solenoid. The solenoid reciprocates a plunger to pump hydraulic fluid to the brakes to increase the pressure after the brakes have been released to avoid a wheel lock condition. The solenoid also acts when it is energized to isolate the master cylinder from the brake applying wheel cylinder and at the same time opens communication between the wheel cylinder and a reservoir to relieve pressure and release the brakes.

15 Claims, 4 Drawing Figures

FIG. I.

SOLENOID POWERED BRAKE PRESSURE MODULATOR

SUMMARY OF THE INVENTION

This invention relates to hydraulic brake pressure modulators for antiskid or antilock brake systems and more particularly to brake pressure modulators employing electrical power to reduce and increase brake applying pressure.

Antiskid or antilock brake systems on vehicles commonly employ wheel speed sensors and logic controllers which monitor the speed of a vehicle wheel and provide an electric control signal to operate a brake pressure to maintain braking of the wheel without locking it. The control signal normally energizes one or more solenoids to operate valving controlling fluid pressure devices which use a vacuum, compressed air or pressurized hydraulic fluid as a power source to move a plunger in one direction to isolate the master cylinder from the brake and reduce brake pressure and in the opposite direction to reapply pressure and apply the brakes. Unfortunately, all of such power sources are not available on all sizes of vehicles or their full capacity is used for operating other devices. Moreover, on smaller vehicles, fluid pressure operated antilock devices are of a large size prohibiting their use even though ample power may be available. Electrical power, however, is common to vehicles of all sizes. Unfortunately attempts to employ electrical power as the energizing source for modulators has not been successful because such modulators become extremely large and utilize large amounts of electrical power. In such devices the solenoid is energized to retract a piston to reduce brake pressure and at the same time to compress a spring. Since the compressed spring is the source of energy for reapplying the brakes when the solenoid is deenergized and since the brakes must be reapplied in a single stroke of the piston, the spring must be relatively large which requires a large power consuming solenoid. This makes such units impractical not only in view of their size and power requirements but because they become heavy and costly.

It is an object of the invention to provide a brake pressure modulator which uses a relatively small solenoid as a power source to retract a piston to reduce brake pressure and which is reciprocated after the brakes are released to pump fluid pressure to increase the braking pressure acting on the brakes.

It is still another object of the invention to provide a brake pressure modulator in which a relatively small solenoid is used to pump hydraulic fluid from a reservoir to the brake applying wheel cylinders after the brakes have been relieved to avoid a wheel lock and which also acts to release the brakes by opening communication between the brake applying wheel cylinders and a reservoir such as that of the master cylinder.

A brake modulator is provided in which a solenoid is used as the source of power to reapply the brakes after they have been released to avoid a wheel lock. The application of the brakes is accomplished by reciprocating a solenoid which operates a pump piston to pump a fixed volume of fluid on each cycle of the solenoid operation to increase the brake pressure and reapply the brakes. The initial retraction of the piston also acts to isolate and maintain the brake applying master cylinder isolated from the brakes during the antilock phase of operation. Retraction of the piston also opens communication between the wheel cylinder and the master cylinder reservoir to release the brakes. Since reapplication of the brakes does not require a single stroke of the solenoid it can be relatively small.

DETAILED DESCRIPTION

Figure 1:
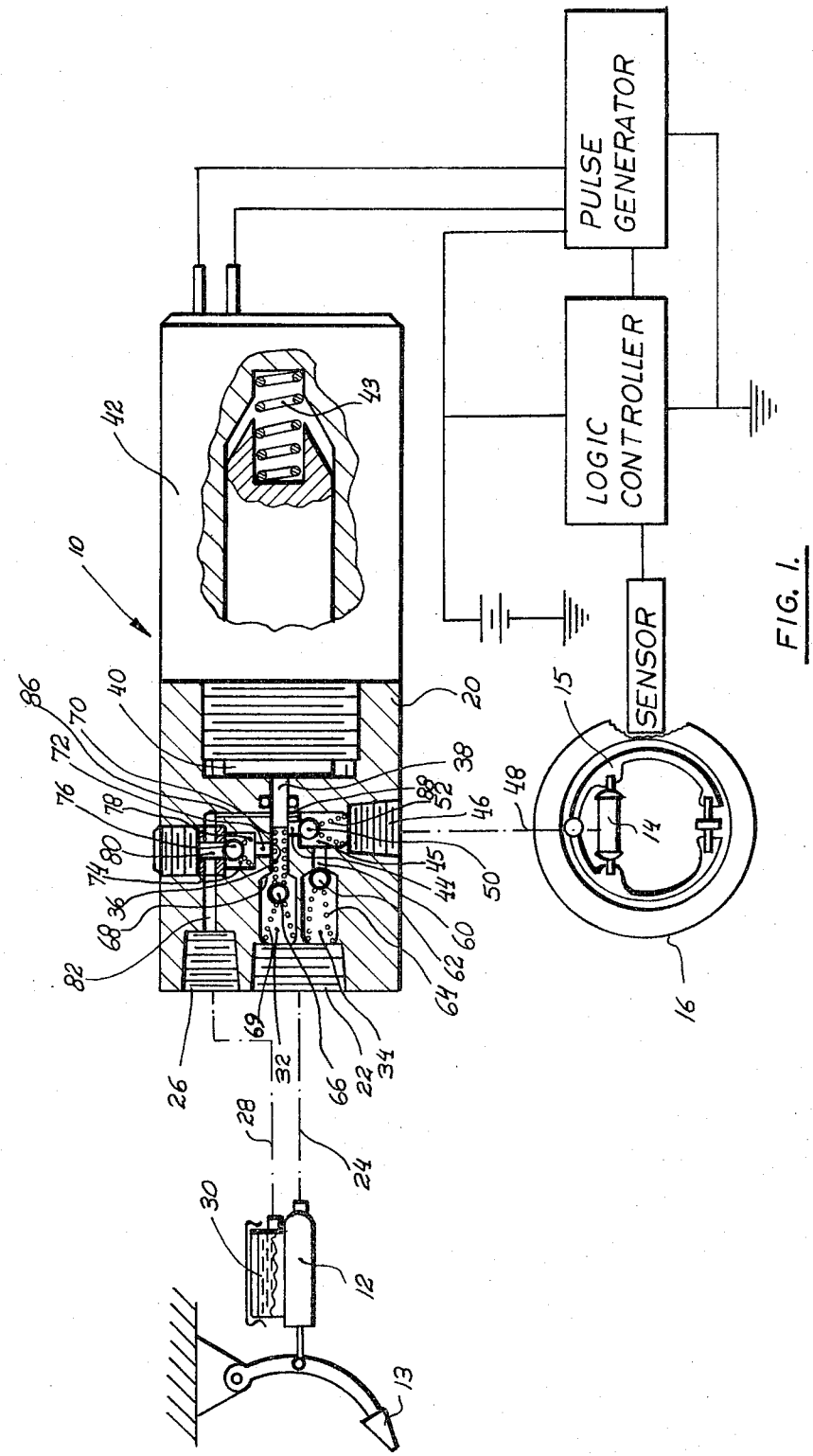
FIG. 1 is a view of the brake pressure modulator embodying the present invention shown partially in section and with associated components of the brake system and control system shown schematically.

Referring to the drawings and particularly to FIG. 1, the system embodying the brake pressure modulator 10 of the present invention includes a conventional master cylinder 12 which is actuated through a pedal 13 by a vehicle operator to deliver or release hydraulic pressure at a conventional wheel cylinder 14 to apply and release brake mechanism 15 acting on a vehicle wheel 16. The brake pressure modulator 10 of the present invention is disposed between the master cylinder 12 and the wheel cylinder 14 and permits the normal and usual type of brake application in the absence of any tendency of the brake wheel to lock.

A sensor of any of the types known in the art is associated with the braked wheel to measure the rotational velocity of the wheel and transmit the reading to a logic controller which in turn computes the change in velocity of the wheel and transmits an appropriate electrical signal to a pulse generator. The pulse generator transmits a further electrical signal to the brake pressure modulator 10 which is used to operate a mechanism to regulate or modulate the hydraulic pressure between the master cylinder 12 and the wheel cylinder 14 as will be described hereafter. Each wheel of a vehicle may be provided with a modulator 10 and associated controls.

The brake pressure modulator 10 includes a housing 20 which has an inlet port 22 connected by a line 24 to the output of the master cylinder 12. A fluid supply or reservoir port 26 is connected by a line indicated at 28 to a reservoir 30 which may be the usual reservoir of the master cylinder 12 or a separate fluid reservoir.

The port 22 communicates with parallel chambers 32 and 34. The chamber 32 communicates with a bore 36 which forms a chamber or cylinder in which a plunger or piston 38 may reciprocate. The piston 38 is connected to the armature or the plunger 40 of a solenoid 42. When the solenoid 42 is energized, the piston 38 is retracted to the right from the position shown in the drawings. Such retraction compresses a spring 43 so that when the solenoid is deenergized, the spring returns the piston 38 to the left to its original position.

The chamber formed by cylinder 36 communicates through a radially extending valve passage 44 with an outlet chamber 45 and with a delivery or outlet port 46 which is connected by a line 48 with the wheel cylinder 14. In the position shown, the valve passage 44 is closed by a ball check valve 50 which is urged to its seated position by a spring 52. The outlet chamber 45 also communicates by way of a valve passage 60 with the chamber 34. In the position shown the passage 60 is closed by a ball check valve 62 urged to its closed position by a spring 64.

Still another ball type valve element 66 is disposed in the chamber 32 and is normally suspended in spaced relationship to its seat 68 by opposed springs 69 and 70. Spring 69 acts between the ball element 66 and a shoulder in one end of the chamber 32 and the other spring 70 acts between the ball closure element 66 and the end of the piston rod 38.

A radially extending port 72 opens to the cylinder chamber 36 and communicates with a cavity 74 which contains a ball check valve 76 urged by a spring 78 to a position closing a valve port 80. The port 80 intersects an elongated passage 82 which communicates with the supply port 26 and the line 28 to the reservoir 30 of the master cylinder 12. The opposite end of the passage 82 communicates with a cross bore 86 of restricted size which intersects and communicates with the cylinder chamber 36. Another cross bore 88 of restricted size is disposed at one side and parallel to the passage 44 and communicates the cylinder chamber 36 with the outlet port 46. Both the bore 86 and the bore 88 are closed by the piston 38 when the solenoid 42 is deenergized as shown in FIG. 1 and will be open to each other and to the cylinder chamber 36 when the piston 38 is retracted upon energization of the solenoid 42.

During normal brake operation, actuation of the master cylinder 12 causes hydraulic fluid to be pressurized at the inlet port 22 and by way of the open check valve 66 at the passage 44. The increase in hydraulic pressure will cause check valve 50 to open against the action of spring 52 and permit hydraulic fluid pressure to be increased at the wheel cylinder 14. During this time, the check valves 62 and 76 will remain closed due to the hydraulic pressure from the master cylinder and the action of the springs 64 and 78, respectively. Upon release of the brakes by relieving pressure at the master cylinder 12, the higher fluid pressure at the wheel cylinder 14 will close check valve 50 and cause check valve 62 to open, permitting hydraulic pressure fluid to be returned to the master cylinder through port 22 and line 24. Such operation is the same as with conventional hydraulic brake systems and as if the brake pressure modulator 10 was not in the hydraulic circuit.

The antilock phase of operation is initiated by the delivery of sufficiently high fluid pressure to the wheel cylinder 14 to actuate the brakes to cause the wheel to lock or to approach a locked condition. This results in a signal from the sensor to the logic controller and pulse generator which energizes the solenoid 42. Upon energization, the solenoid 42 retracts the piston 38 to the right from the position in FIG. 1 to the position in FIG. 3 so that the end of the piston 38 forming a seat for one end of the spring 70 retracts and reduces the effectiveness of the spring 70 to maintain the ball element 66 in the open position. As a result, ball 66 moves to the right and closes on its seat 68 where it is maintained in the closed position by the high pressure of the hydraulic fluid from the master cylinder 12 acting thereon. The ball check valve 62 also is retained in a closed position by the same hydraulic pressure and as a result, the master cylinder 12 is isolated from the wheel cylinder 14 and the modulator 10 to prevent any further increase in brake pressure at the wheel cylinder 14.

Retraction of the piston 38 increases the fluid containing volume of the cylinder 36 between the closed check valve 66 and the end of the piston 38 and at the same time, the restricted passages or bores 86 and 88 are opened to the cylinder bore 36. This permits the relatively high wheel cylinder pressure to bleed through passage 88, cylinder chamber 36 and through the passage 86 to the elongated passage 82, the port 26 and the line 28 to the reservoir 30. This relieves the brake applying pressure at the wheel cylinder 14 to the reservoir 30 so that the brakes are released sufficiently and the wheel can begin to rotate to avoid wheel lock.

After the brake has been released sufficiently, the logic controller and pulse generator delivers a second signal in the form of rapid pulsations causing the solenoid 42 to be energized and deenergized in rapid succession. In the first cycle of such pulsations, the solenoid 42 will first be deenergized causing the solenoid plunger 40 and consequently the piston 38 to move to the left as viewed in the drawings under the action of spring 43. Such movement will increase the pressure in the cylinder chamber 36 which remains closed at its left end by the ball check valve 66 held in its closed position by the much higher pressure from the master cylinder 12. Continued movement of the piston 38 to the left causes it to first close passages 86 and 88. As soon as passage 86 is closed, a volume of fluid is trapped in the cylinder chamber 36. The trapped fluid is pressurized and displaced through the check valve 50 which will open against the spring 52 and pass to the wheel cylinder 14 to increase braking pressure. During the pressurizing stroke of the piston 38, the check valves 62 and 66 will remain closed due to the high master cylinder pressure and check valve 76 closes due to pressure in the cylinder 36. Thereafter the solenoid 42 will be energized again causing piston 38 to return to the right and draw fluid into the cylinder 36 from the reservoir 30 through the open check valve 76 which will open under the action of pressure against the force of the relatively light spring 78. Retraction of the piston 38 also opens the passage 88 to the wheel cylinder 14 but the piston reciprocates at such a speed that the passage is open for only a short period of time and does not seriously detract from the efficiency of the pumping action. As an alternative, the train of pulses can be of such a high frequency that the plunger does not retract far enough to open the passages 86 and 88 in which case fluid is supplied to the cylinder 36 from the reservoir 30 through the check valve 76.

Deenergization and energization of the solenoid 42 in rapid succession will cause fluid to be pumped from the reservoir 30 to the wheel cylinder 14 to cause reapplication of the brakes. When the brakes are applied to a point where locking of the wheels may occur, the second pulsating series of signals is terminated and the first type of signal is delivered to energize the solenoid 42 and return the piston 38 to relieve the brakes as previously described.

Figure 2:
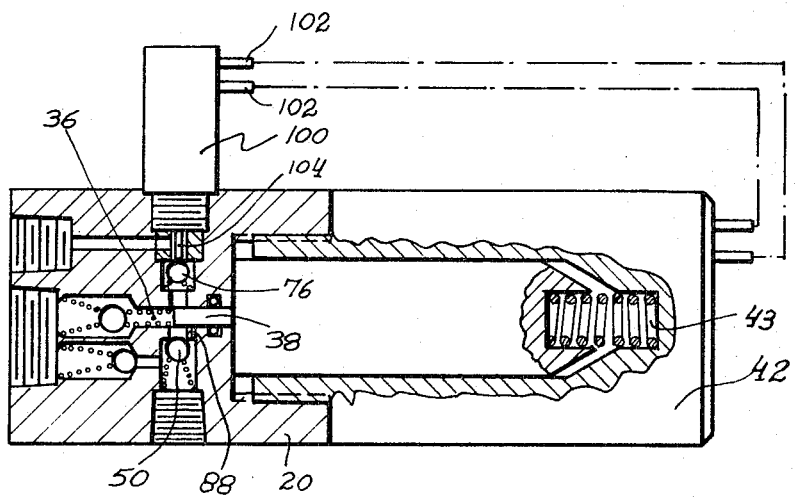
FIG. 2 shows a modification of a brake pressure modulator embodying the invention.
Figure 3:
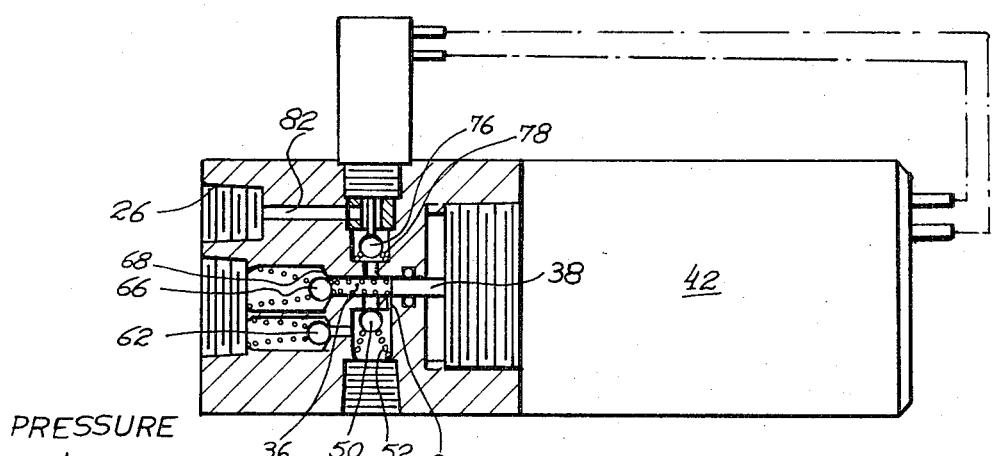
FIG. 3 shows the brake pressure modulator of FIG. 2 in another position of operation.

In another embodiment of the invention as viewed in FIGS. 2 and 3, the modulator employs a push type solenoid which has its terminals 102 connected to the same terminals as solenoid 42 so that energizing the latter simultaneously energizes solenoid 100. Solenoid 100 is supported relative to the housing 20 so that when the solenoid 100 is deenergized a solenoid plunger 104 engages the check valve 76. Upon energization of the solenoid 100, the plunger 104 moves the check valve 76 from the closed position in FIG. 2 to the open position in FIG. 3. This embodiment of the invention also differs from the embodiment in FIG. 1 in that the passage 86 has been eliminated. In all other respects the two forms of modulator are identical and the same reference characters have been used to identify identical parts.

In the embodiment of FIGS. 2 and 3, energization of solenoid 42 simultaneously energizes solenoid 100. This results in opening of the check value 76 by the plunger 104 and opening of the restricted passage 88 by the piston 38 as seen in FIG. 3 so that pressurized hydraulic fluid at the wheel cylinder 14 is released through line 48, passage 88, open check valve 76, elongated passage 82 and the line 28 to the hydraulic master cylinder reservoir 30.

When the brakes have been released so that proper wheel rotation can resume sufficiently, solenoids 42 and 100 are deenergized and energized repeatedly in response to the second form of signal to begin rapid reciprocation of the plunger 104 and the piston 38. The solenoid 100 is much smaller than solenoid 42 and consequently can respond to an electrical signal much faster than solenoid 42. Each time the plunger 38 moves to the left from the position in FIG. 3 to the position in FIG. 2 the check valve 76 has already been closed because of the rapid response of solenoid 100 to move the plunger 104 upwardly. Consequently, fluid trapped in the cylinder 36 is pressurized by the piston 38 and forced through open check valve 50 to wheel cylinder 14 to increase brake pressure. Each cycle of reciprocation of the piston 38 is effective to pump a fixed volume of fluid from the master cylinder reservoir 30 to the wheel cylinder 14 to increase braking pressure. When the brake pressure has been increased sufficiently to again bring about a potential wheel lock, the second form of pulsating signal is terminated and the first form of signal is delivered by the logic controller to maintain the piston 38 in a retracted position and release the brakes.

Figure 4:
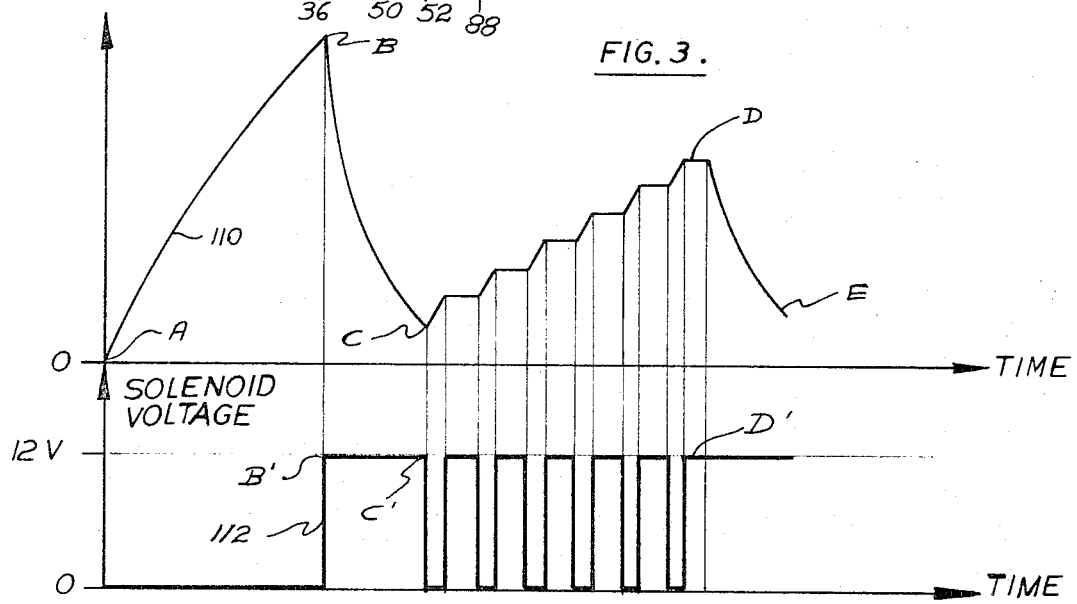
FIG. 4 is a graph showing both pressure and voltage levels during typical operation of the brake pressure modulator over a period of time.

The operation of the solenoid powered modulator can be visualized best by referring to FIG. 4 showing a curve 110 in which the vertical coordinate represents brake or hydrulic pressure at the wheel cylinder 14 and the horizontal coordinate represents time. Also shown is a corresponding curve 112 which represents the voltage level at the solenoid 42 and solenoid 100 for the same time period.

Referring to FIG. 4 and particularly to curve 110 in connection with the embodiment shown in FIG. 1, the brakes are applied from point A to point B at which time a wheel lock is indicated by the sensor. As a result, the voltage is increased as indicated at point B' on curve 112, causing energization of solenoid 42 and release of the brake pressure from point B to point C on curve 110. The release of the brake pressure is at a relatively low rate due to the metering of the hydraulic fluid passing through restricted passage 88.

At point C the brakes have been released sufficiently for the wheel to resume rotation and as a consequence, the solenoid 42 is first deenergized and then rapidly energized and deenergized as inciated by the voltage levels between points C' and D' on curve 112 in response to a second form of signal from the logic controller. This produces the pumping action which results in incremental increases in brake pressure from point C on curve 110 until a wheel lock condition is attained at point D. At point D, the first type of signal is employed to energize the solenoid and release the brakes from point D to the point E. The brake release and brake reapplication by the pumping action are repeated until the vehicle comes to a stop or until the operator releases the master cylinder.

It will be noted that the piston 38 provides a fixed volume of displacement of hydraulic fluid in each cycle of piston reciprocation and the resulting brake reapplication rate indicated between points C and D on curve 110 is uniform. Furthermore, unlike single stroke brake pressure modulators which have a limited volumetric capacity the present modulator is of unlimited volumetric capacity since the piston 38 can be reciprocated as many times as needed by a relatively small solenoid to supply the required level of brake reapplication pressure.

It will now be seen that there has been provided a solenoid powered brake pressure modulator which isolates the master cylinder from the brakes and releases brake pressure at the wheels to avoid wheel lock and which thereafter acts as a pump to increase brake pressure to reapply the brakes until another wheel lock condition is approached at which time the brakes are again released.

What is claimed is:

1. A brake pressure modulator operable in response to signals of a wheel lock condition and the end of the wheel lock condition for use in a hydraulic brake system having a brake master cylinder, a brake applying cylinder and a reservoir of fluid and comprising: a housing having a fluid inlet port, a fluid outlet port, and a reservoir port adapted to be connected to the master cylinder, brake applying cylinder and reservoir, respectively, valve means for relieving fluid pressure from said outlet port to said reservoir port in response to a first signal of a wheel lock condition, pump means delivering fluid under pressure to said outlet port in response to a second signal at the end of said wheel lock condition, and solenoid means for operating said valve means in response to said first signal and for operating said pump means in response to said second signal.

2. The brake pressure modulator defined in claim 1 wherein said pump means includes a chamber formed by said housing, a plunger having a piston portion forming a wall of said chamber, said plunger being slidable in one direction to enlarge said chamber to receive fluid from said reservoir port and in the opposite direction to constrict said chamber to displace fluid therefrom to said outlet port, said plunger being reciprocated by said solenoid at a fixed and controlled rate.

3. The brake pressure modulator defined in claim 1 wherein said modulator includes a housing forming a chamber therein, said valve means includes passage means formed in said housing between said outlet port and said chamber, and said pump means includes a plunger slidable between a position opening and a position closing said passage.

4. The brake pressure modulator set forth in claim 2 wherein said valve means includes passage means formed in said housing between said outlet port and said reservoir port and wherein said plunger closes said passage means when said plunger moves in said opposite direction.

5. The brake pressure modulator defined in claim 2 wherein first valve means are disposed between said chamber and said reservoir port to permit fluid flow from the latter to said chamber and to prevent fluid flow from said chamber to said reservoir, and wherein second valve means are disposed between said chamber and said outlet port to permit fluid flow from said chamber to said outlet port and prevent fluid flow from said outlet port to said chamber.

6. The brake pressure modulator defined in claim 2 and further comprising additional passage means between said inlet port and said chamber, and additional valve means in said passage means normally being disposed in an open position to permit fluid flow in said passage means, said additional valve means being movable to a closed position in response to a first signal sensing the beginning of a wheel lock condition and remaining in a closed position in the presence of brake applying pressure at said inlet port during subsequent signals.

7. The brake pressure modulator set forth in claim 6 and further comprising biasing means between said plunger and said additional valve means to maintain said valve open when said plunger is in a first position prior to said first signal of a wheel lock condition and movable with said plunger to a second position to permit closing of said valve means in response to said first signal.

8. A brake pressure modulator operable in response to signals of wheel lock condition and the end of the wheel lock condition for use in a hydraulic brake system having a brake master cylinder and a brake applying when cylinder and comprising; a housing having a fluid inlet port, a fluid outlet port, and a fluid reservoir port adapted to be connected to the master cylinder, the wheel cylinder and a source of hydraulic fluid, respectively, a chamber formed in said housing and connected to said ports, a plunger slidable in said housing between first and second positions and forming a movable wall in said chamber, solenoid means for moving said plunger in response to said signals, first passage means communicating said inlet port with said outlet port and normally being opend when said plunger is in a first position, valve means in said first passage means normally being open to permit communication between said inlet and outlet ports, second passage means communicating said outlet port and said chamber and normally being closed by said plunger when the latter is in a first position, said plunger being movable from said first to a second position in response to an initial signal of a wheel lock condition to close said valve means and to open said second passage means to relieve pressure at said outlet port, said plunger being reciprocated continuously between said second and first positions in response to a signal at the end of said wheel lock condition and until a subsequent signal of a subsequent wheel lock condition to admit fluid from said outlet port to said chamber upon movement of said plunger to said first position to increase brake applying pressure at said outlet port independently of the pressure at said inlet port.

9. The brake pressure modulator defined in claim 8 and further comprising an auxiliary fluid passage formed in said housing between said reservoir port and said chamber, said auxiliary passage being closed by said plunger in its first position and being open to admit fluid from said reservoir port when said plunger is in said second position.

10. The brake pressure modulator defined in claim 8 and further comprising check valve means between said reservoir port and chamber to prevent fluid flow from the latter to said reservoir port.

11. The brake pressure modulator defined in claim 10 and further comprising additional solenoid means for permitting fluid communication between said outlet port and said reservoir port in response to a signal moving said plunger from said first to said second position.

12. The brake pressure modulator defined in claim 11 in which said additional solenoid means responds to said signal faster than said solenoid means moving said plunger.

13. The brake pressure modulator set forth in claim 8 and further comprising first check valve means between said outlet port and said chamber and preventing communication between the latter and said outlet port when said plunger moves from first to said second position, and second check valve means between said chamber and reservoir port and preventing communication between the latter and said chamber when said plunger moves from said second to said first position.

14. The brake pressure modulator defined in claim 13 and further comprising third check valve means between said inlet port and said outlet port and normally being closed in the presence of pressure at said inlet port.

15. The brake pressure modulator defined in claim 13 and further comprising additional solenoid means for moving said second check valve means to an open position permitting fluid communication from said outlet port to said reservoir port to said chamber in response to a signal moving said plunger from said first to said second position.

* * * * *